(12) United States Patent
Hernandez-Zelaya

(10) Patent No.: US 7,315,250 B1
(45) Date of Patent: Jan. 1, 2008

(54) ELECTRICAL FLUID ACTIVATED SWITCH

(76) Inventor: Rodolfo Hernandez-Zelaya, 4217 E. 98 Ave., Tampa, FL (US) 33617-4432

( * ) Notice: Subject to any disclaimer, the term of this patent is extended or adjusted under 35 U.S.C. 154(b) by 535 days.

(21) Appl. No.: 11/013,645

(22) Filed: Dec. 16, 2004

Related U.S. Application Data

(63) Continuation-in-part of application No. 10/961,492, filed on Oct. 8, 2004, which is a continuation-in-part of application No. 10/447,054, filed on May 28, 2003, now Pat. No. 7,009,125, which is a continuation-in-part of application No. 10/224,811, filed on Aug. 21, 2002, now abandoned.

(51) Int. Cl.
*G01F 23/30* (2006.01)

(52) U.S. Cl. .................. 340/624; 73/308; 73/319; 200/61.2

(58) Field of Classification Search .......... 340/624; 73/304 C, 305–308, 319, 321; 62/150, 285–291; 137/558; 200/61.2
See application file for complete search history.

(56) References Cited

U.S. PATENT DOCUMENTS

| | | | | |
|---|---|---|---|---|
| 303,656 A | * | 8/1884 | Metzger et al. | 285/143.1 |
| 4,633,673 A | * | 1/1987 | Morrison et al. | 62/129 |
| 4,893,846 A | * | 1/1990 | McGraw | 285/133.4 |
| 6,161,876 A | * | 12/2000 | Sabathie | 285/39 |
| 6,329,493 B1 | * | 12/2001 | El-Hibri et al. | 528/125 |
| 6,442,955 B1 | * | 9/2002 | Oakner et al. | 62/150 |
| 6,513,378 B1 | * | 2/2003 | Love, Jr. | 73/313 |
| 6,698,215 B2 | * | 3/2004 | Bush et al. | 62/150 |

* cited by examiner

*Primary Examiner*—Terry K Cecil
(74) *Attorney, Agent, or Firm*—Edward P. Dutkiewicz

(57) ABSTRACT

An electrical field activated switch system includes a fluid container 14 having an aperture formed in a sidewall thereof. The floor of the primary tray 22 is positioned entirely beneath the fluid container and a secondary tray is positioned entirely within the primary tray and in proximity to and at an elevation beneath the aperture. A tube 30 is coupled between the aperture and the secondary tray. A housing 36 has an open bottom secured to the secondary tray with a cylinder 38 vertically oriented therein. A base 40 is supported upon the secondary tray floor. An electrical induction switch assembly includes two wires with stripped lower ends positioned within the cylinder with their lower ends being separated and in proximity to the base. A float is slidably received upon the cylinder with a magnetic plate secured to the float.

6 Claims, 3 Drawing Sheets

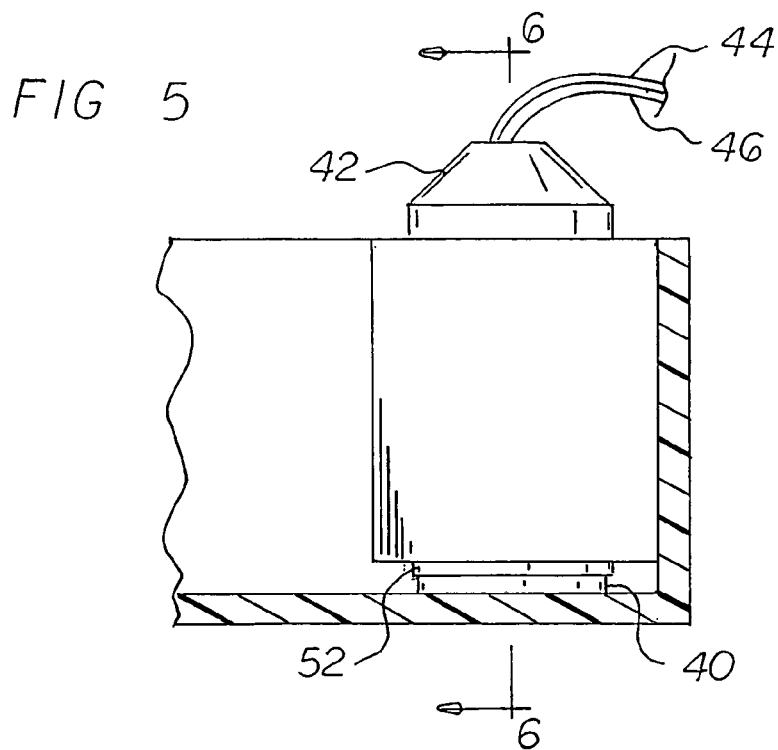
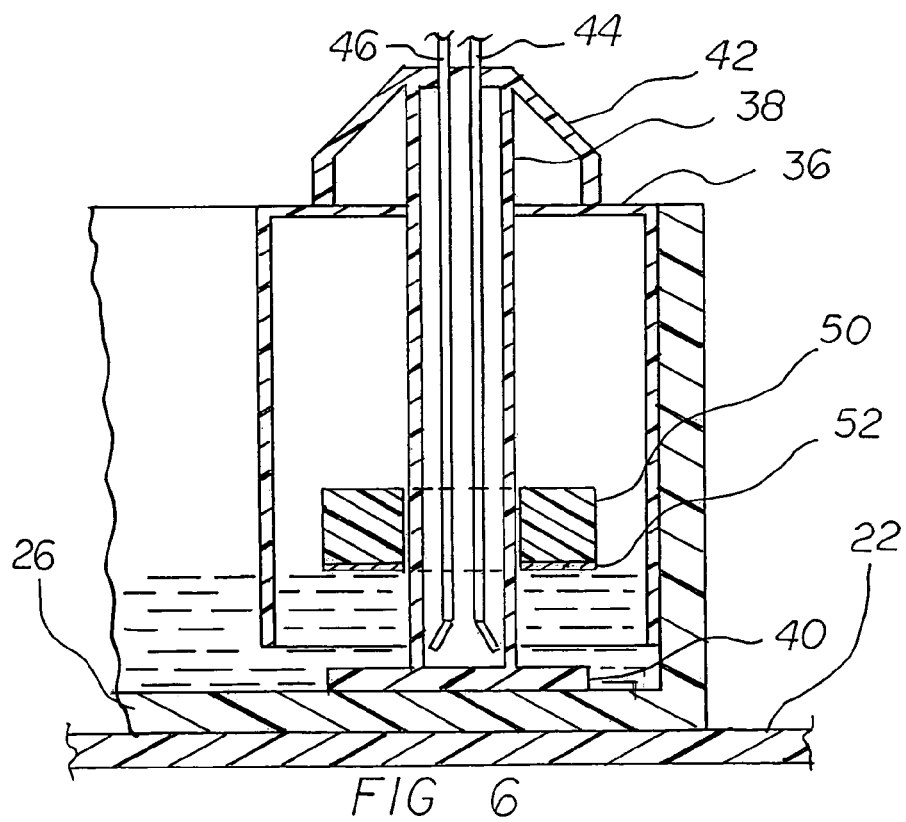

ELECTRICAL FLUID ACTIVATED SWITCH

RELATED APPLICATION

The present application is a continuation-in-part of pending U.S. patent application Ser. No. 10/961,492 filed Oct. 8, 2004 which is a continuation-in-part of U.S. patent application Ser. No. 10/447,054 filed May 28, 2003, now U.S. Pat. No. 7,009,125, which, in turn, is a continuation-in-part of U.S. patent application Ser. No. 10/224,811 filed Aug. 21, 2002, now abandoned.

BACKGROUND OF THE INVENTION

1. Field of the Invention

The present invention relates to an electrical field activated switch and more particularly pertains to allowing a user to safely and conveniently control the fluid level of a container by having a switch control the fluid flow level of the container.

2. Description of the Prior Art

The use of switches of known designs and configurations is known in the prior art. More specifically, switches of known designs and configurations previously devised and utilized for the purpose of controlling the fluid level of a container by conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,893,846 issued Jan. 16, 1990, to McGraw discloses connector fittings. U.S. Pat. No. 6,161,876 issued Dec. 19, 2000, to Sabathie discloses an elbow connection for tubular manifold for a motor vehicle air-conditioning system. U.S. Pat. No. 6,329,493 issued Dec. 11, 2001, to El Hibri et al. discloses plumbing articles from poly, aryl ether sulfones. U.S. Pat. No. 303,656 issued Aug. 19, 1884, to Metzger et al. discloses a faucet coupling. Lastly, U.S. Pat. No. 4,633,673 issued Jan. 6, 1987, to Morrison et al. discloses an emergency shutoff for air conditioners.

While these devices fulfill their respective, particular objectives and requirements, the aforementioned patents do not describe an electrical field activated switch that allows allowing a user to safely and conveniently control the fluid level of a container by having a switch control the fluid flow level of the container.

In this respect, the electrical field activated switch according to the present invention substantially departs from the conventional concepts and designs of the prior art, and in doing so provides an apparatus primarily developed for the purpose of allowing a user to safely and conveniently control the fluid level of a container by having a switch control the fluid flow level of the container.

Therefore, it can be appreciated that there exists a continuing need for a new and improved electrical field activated switch which can be used for allowing a user to safely and conveniently control the fluid level of a container by having a switch control the fluid flow level of the container. In this regard, the present invention substantially fulfills this need.

SUMMARY OF THE INVENTION

In view of the foregoing disadvantages inherent in the known types of switches of known designs and configurations now present in the prior art, the present invention provides an improved electrical field activated switch. As such, the general purpose of the present invention, which will be described subsequently in greater detail, is to provide a new and improved electrical field activated switch and method which has all the advantages of the prior art and none of the disadvantages.

To attain this, the present invention essentially comprises an electrical field activated switch system for allowing a user to reliably and conveniently control the fluid level of a container by having a switch control a fluid flow device. The system comprises, in combination, a fluid container with a side wall and an aperture formed in the side wall, the container adapted to accumulate fluid during operation and use and to cause the flow of accumulated fluid, when above a predetermined level, from the container through the aperture.

Next provided is a primary tray which has a horizontally oriented floor with upstanding side walls adapted to receive and retain fluid therein if received. The primary tray has long side edges and long end edges of sufficient largeness to be positioned entirely beneath the fluid container.

A secondary tray is provided which has a horizontally oriented floor with upstanding side walls adapted to receive and retain fluid therein when received. The secondary tray has short side edges and short end edges of sufficient shortness to be positioned entirely within the primary tray in proximity to, and at an elevation beneath, the aperture.

A tube is in an inverted L-shaped configuration with an upper end operatively coupled with respect to the aperture and a lower end operatively coupled with respect to the secondary tray whereby any flow of accumulated fluid from the container, when above a predetermined level, will be fed by gravity from the container through the aperture and tube into the secondary tray, he tube also having a receptor in a generally cylindrical configuration extending upwardly from the floor of the secondary tray at a corner thereof close to the aperture, the receptor having a vertically extending opening along one minor arcuate extent and an inwardly extending flange to receive and support the lower end of the tube and maintain it spaced from the floor of the secondary tray.

A housing is next provided. The housing is in a generally rectilinear configuration with a circular opening at the top and an open bottom secured to a corner of the secondary housing remote from the receptor, the circular opening being at an elevation essentially equal to the top of the secondary tray with the open bottom being at an elevation above the floor of the secondary tray. The housing also includes an interior cylinder vertically oriented within the housing and extending through the circular opening with a circular base supported upon the floor of the secondary tray and with a cover in a truncated cone-shaped configuration supporting the upper end of the cylinder on the housing.

Lastly provided is an electrical induction switch assembly including two plastic clad wires with stripped lower end positioned within the cylinder with their lower ends being separated and in proximity to the base and a torus-shaped float with a flat lower surface slidably received upon the lower extent of the cylinder. The float is fabricated of a buoyant material to thereby rise and fall as the float slides up and down on the cylinder in response to an increase and decrease of the fluid level within the housing and secondary tray, a magnetic plate in a washer shaped configuration and having a flat upper surface secured to the lower surface of the float for movement therewith the base functioning to limit the downward movement of the float and washer.

The wires extend along the length of the tube upwardly and out of the cylinder and cover for allowing a switching to control the level of fluid within the container. The disk is an electrical induction member adapted to create an electrical flow within the wires when the float and magnetic plate rests on the base with little or no fluid within the housing, the disk adapted to terminate an electrical flow within the wires when the float and magnetic plate rise above the stripped ends of the wires due to excess fluid within the housing, thereby activating and inactivating a switch in response to the rise and fall of fluid within the coupling.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electrical field activated switch which has all of the advantages of the prior art switches of known designs and configurations and none of the disadvantages.

It is another object of the present invention to provide a new and improved electrical field activated switch which may be easily and efficiently manufactured and marketed.

It is further an object of the present invention to provide a new and improved electrical field activated switch which is of durable and reliable constructions.

An even further object of the present invention is to provide a new and improved electrical field activated switch which is susceptible of a low cost of manufacture with regard to both materials and labor, and which accordingly is then susceptible of low prices of sale to the consuming public, thereby making such electrical field activated switch economically available to the buying public.

Even still another object of the present invention is to provide an electrical field activated switch for allowing a user to safely and conveniently control the fluid level of a container by having a switch control the fluid flow level of a container by having a switch control the fluid flow from the container.

Lastly, it is an object of the present invention to provide a new and improved electrical field activated switch system having a fluid container with a side wall and an aperture formed in the side wall. A primary tray has a floor positioned entirely beneath the fluid container. A secondary tray has a floor positioned entirely within the primary tray in proximity to, and at an elevation beneath, the aperture. A tube has an upper end coupled with respect to the aperture and a lower end operatively coupled with respect to the secondary tray. A housing has an open bottom secured to the secondary tray with a cylinder vertically oriented within the housing and with a base supported upon the floor of the secondary tray. Lastly, an electrical induction switch assembly includes two wires with stripped lower ends positioned within the cylinder with their lower ends being separated and in proximity to the base and a float slidably received upon the lower extent of the cylinder with a magnetic plate secured to the float.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 4 and 5 are cross sectional views taken along lines 4-4 and 5-5 respectively of FIG. 3.

FIG. 6 is a cross sectional view taken along line 6-6 of FIG. 5.

The same reference numerals refer to the same parts throughout the various Figures.

DESCRIPTION OF THE PREFERRED EMBODIMENT

Figures 1, 2:
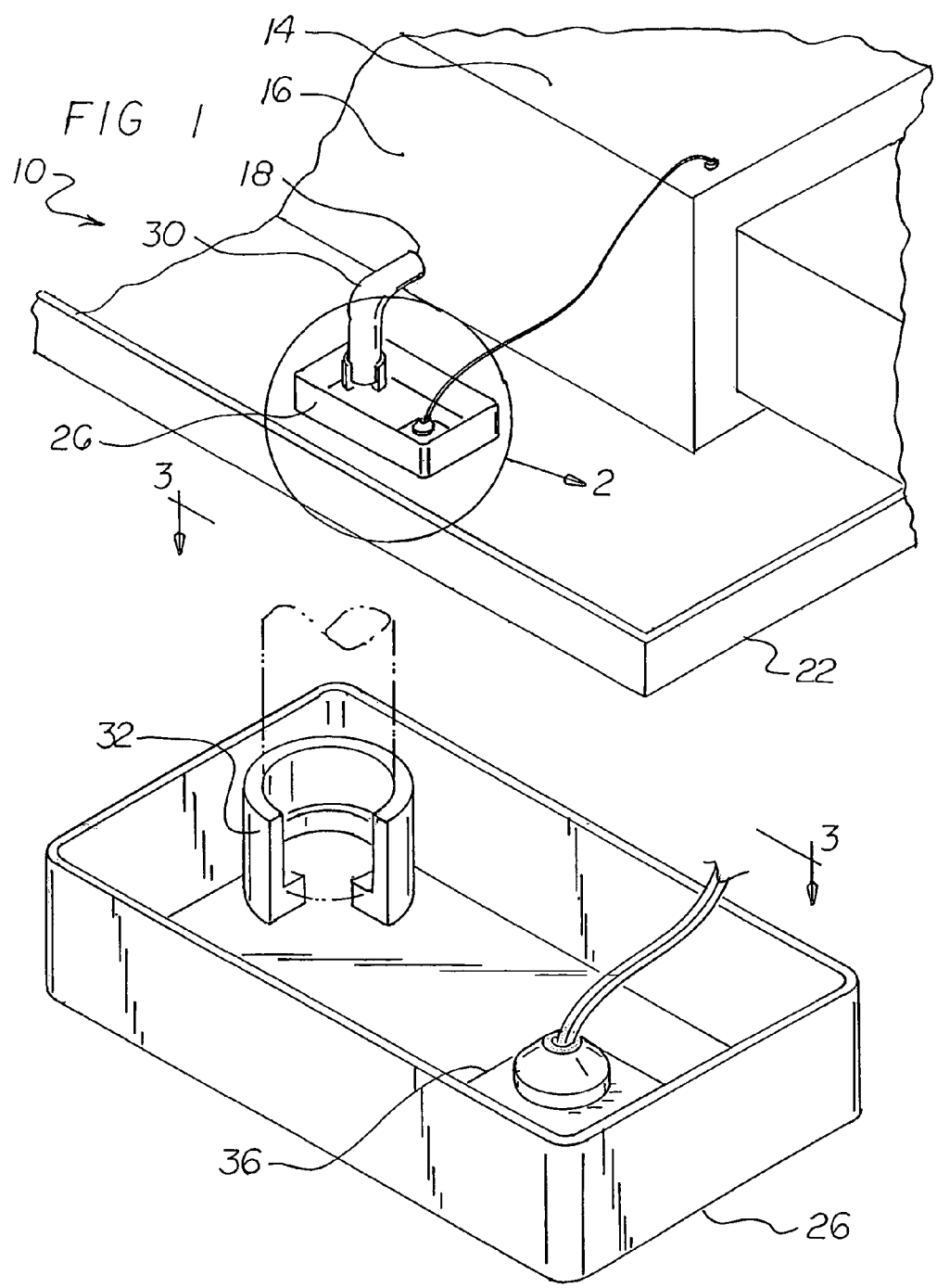
FIG. 1 is a perspective illustration of an electrical field activated switch system constructed in accordance with the principles of the present invention.
FIG. 2 is an enlarged perspective illustration of the secondary tray and associated components shown in FIG. 1.
Figure 3:
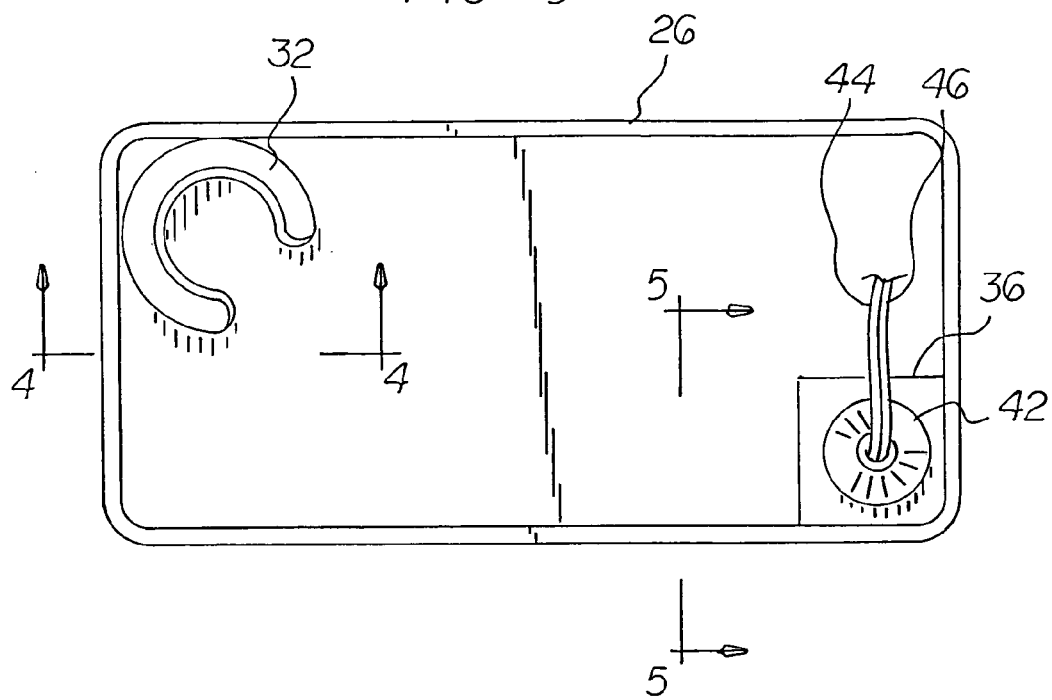
FIG. 3 is a plan view of the secondary tray and associated components taken at line 3-3 of FIG. 2.
Figure 4:
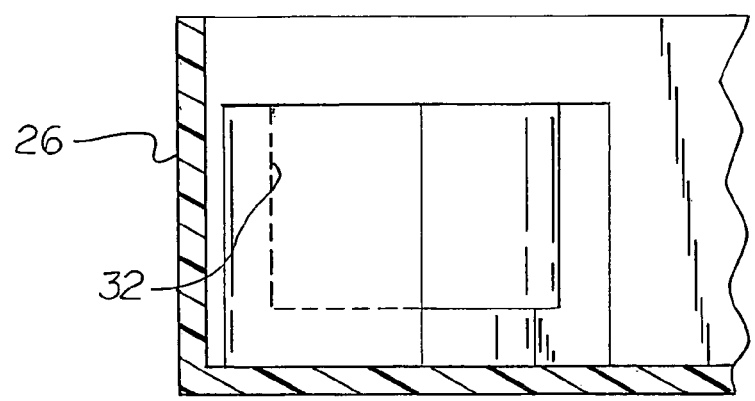

With reference now to the drawings, and in particular to FIG. 1 thereof, the preferred embodiment of the new and improved electrical field activated switch embodying the principles and concepts of the present invention and generally designated by the reference numeral 10 will be described.

The present invention, the electrical field activated switch system 10 is comprised of a plurality of components. Such components in their broadest context include a container, a primary tray, a secondary tray, a tube, a housing and an electrical induction switch. The system functions for allowing a user to reliably and conveniently control the fluid level of a container by having a switch control a fluid flow device. The system comprises, in combination, a fluid container 14 with a side wall 16 and an aperture 18 formed in the side wall. The container is adapted to accumulate fluid during operation and use and to cause the flow of accumulated fluid, when above a predetermined level, from the container through the aperture.

A primary tray 22 is first provided. Such primary tray has a horizontally oriented floor with upstanding side walls adapted to receive and retain fluid therein if received. The primary tray has long side edges and long end edges of sufficient largeness to be positioned entirely beneath the fluid container.

A secondary tray 26 is next provided. Such secondary tray has a horizontally oriented floor with upstanding side walls adapted to receive and retain fluid therein when received. The secondary tray has short side edges and short end edges of sufficient shortness to be positioned entirely within the primary tray in proximity to, and at an elevation beneath, the aperture.

Next provided is a tube 30 in an inverted L-shaped configuration. The tube has an upper end operatively coupled with respect to the aperture and a lower end operatively coupled with respect to the secondary tray whereby any flow of accumulated fluid from the container, when above a predetermined level, will be fed by gravity from the container through the aperture and tube into the secondary tray.

In association with the tube is a receptor 32 in a generally cylindrical configuration. The receptor extends upwardly from the floor of the secondary tray at a corner thereof close to the aperture. The receptor has a vertically extending opening along one minor arcuate extent and an inwardly extending flange to receive and support the lower end of the tube and maintain it spaced from the floor of the secondary tray.

A housing 36 is next provided. Such housing is in a generally rectilinear configuration with a circular opening at the top and an open bottom. The housing is secured to a corner of the secondary housing remote from the receptor. The circular opening is at an elevation essentially equal to the top of the secondary tray with the open bottom being at an elevation above the floor of the secondary tray. The housing also includes an interior cylinder 38 vertically oriented within the housing and extending through the circular opening with a circular base 40 supported upon the floor of the secondary tray and with a cover 42 in a truncated cone-shaped configuration supporting the upper end of the cylinder on the housing.

Lastly provided is an electrical induction switch assembly. Such assembly includes two plastic clad wires 44, 46 with stripped lower end. The wires are positioned within the cylinder with their lower ends being separated and in proximity to the base. A torus-shaped float 50 with a flat lower surface is slidably received upon the lower extent of the cylinder. The float is fabricated of a buoyant material to thereby rise and fall as the float slides up and down on the cylinder in response to an increase and decrease of the fluid level within the housing and secondary tray.

A magnetic plate 52 in a washer shaped configuration and having a flat upper surface is secured to the lower surface of the float for movement therewith. The base functions to limit the downward movement of the float and washer.

The wires extend along the length of the tube upwardly and out of the cylinder and cover. This arrangement allows for a switching to control the level of fluid within the container. The disk, being an electrical induction member, is adapted to create an electrical flow within the wires when the float and magnetic plate rests on the base with little or no fluid within the housing. The disk is adapted to terminate an electrical flow within the wires when the float and magnetic plate rise above the stripped ends of the wires due to excess fluid within the housing, thereby activating and inactivating a switch in response to the rise and fall of fluid within the coupling.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of United States is as follows:

1. An electrical field activated switch system comprising:
   a fluid container with a side wall and an aperture formed in the side wall;
   a primary tray having a floor positioned entirely beneath the fluid container;
   a secondary tray having a floor and positioned entirely within the primary tray and in proximity to, and at an elevation beneath, the aperture;
   a tube with an upper end coupled with respect to the aperture and a lower end operatively coupled with respect to the secondary tray;
   a housing with an open bottom secured to the secondary tray with a cylinder vertically oriented within the housing and with a base supported upon the floor of the secondary tray; and
   an electrical induction switch assembly including two wires with stripped lower ends positioned within the cylinder with their lower ends being separated and in proximity to the base and a float slidably received upon the lower extent of the cylinder with a magnetic plate secured to the float.

2. The system as set forth in claim 1 and further including a receptor in a generally cylindrical configuration extending upwardly from the floor of the secondary tray at a corner thereof, the receptor having a vertically extending opening along one minor arcuate extent and an inwardly extending flange to receive and support the lower end of the tube and maintain it spaced from the floor of the secondary tray.

3. The system as set forth in claim 1 wherein the housing is in a generally rectilinear configuration with a circular opening at the top and an open bottom secured to a corner of the secondary housing remote from the receptor, the circular opening being at an elevation essentially equal to the top of the secondary tray with the open bottom being at an elevation above the floor of the secondary tray.

4. The system as set forth in claim 1 wherein the interior cylinder is vertically oriented within the housing and extending through the housing with a circular base supported upon the floor of the secondary tray and with a cover in a truncated cone-shaped configuration supporting the upper end of the cylinder on the housing.

5. The system as set forth in claim 1 wherein the two wires with stripped lower ends are plastic clad wires and are positioned within the cylinder and wherein the float is torus-shaped with a flat lower surface slidably received upon the lower extent of the cylinder, the float being fabricated of a buoyant material to thereby rise and fall as the float slides up and down on the cylinder in response to an increase and decrease of the fluid level within the housing and secondary tray, a magnetic plate in a washer shaped configuration and having a flat upper surface secured to the lower surface of the float for movement therewith with the base functioning to limit the downward movement of the float and magnetic plate, the wires extending along the length of the tube upwardly and out of the cylinder and cover for allowing a switching to control the level of fluid within the container, the disk being an electrical induction member adapted to create an electrical flow within the wires when the float and magnetic plate rests on the base with little or no fluid within the housing, the disk adapted to terminate an electrical flow within the wires when the float and magnetic plate rise above the stripped ends of the wires due to excess fluid within the housing, thereby activating and inactivating a switch in response to the rise and fall of fluid within the coupling.

6. An electrical field activated switch system for allowing a user to reliably and conveniently control the fluid level of a container by having a switch control a fluid flow device comprising, in combination:

- a fluid container with a side wall and an aperture formed in the side wall, the container adapted to accumulate fluid during operation and use and to cause the flow of accumulated fluid, when above a predetermined level, from the container through the aperture;
- a primary tray having a horizontally oriented floor with upstanding side walls adapted to receive and retain fluid therein if received, the primary tray having long side edges and long end edges of sufficient largeness to be positioned entirely beneath the fluid container;
- a secondary tray having a horizontally oriented floor with upstanding side walls adapted to receive and retain fluid therein when received, the secondary tray having short side edges and short end edges of sufficient shortness to be positioned entirely within the primary tray and in proximity to, and at an elevation beneath, the aperture;
- a tube in an inverted L-shaped configuration with an upper end operatively coupled with respect to the aperture and a lower end operatively coupled with respect to the secondary tray whereby any flow of accumulated fluid from the container, when above a predetermined level, will be fed by gravity from the container through the aperture and tube into the secondary tray, the tube also having a receptor in a generally cylindrical configuration extending upwardly from the floor of the secondary tray at a corner thereof close to the aperture, the receptor having a vertically extending opening along one minor arcuate extent and an inwardly extending flange to receive and support the lower end of the tube and maintain it spaced from the floor of the secondary tray;
- a housing in a generally rectilinear configuration with a circular opening at the top and an open bottom secured to a corner of the secondary housing remote from the receptor, the circular opening being at an elevation essentially equal to the top of the secondary tray with the open bottom being at an elevation above the floor of the secondary tray, the housing also including an interior cylinder vertically oriented within the housing and extending through the circular opening with a circular base supported upon the floor of the secondary tray and with a cover in a truncated cone-shaped configuration supporting the upper end of the cylinder on the housing; and
- an electrical induction switch assembly including two plastic clad wires with stripped lower ends positioned within the cylinder with their lower ends being separated and in proximity to the base and a torus-shaped float with a flat lower surface slidably received upon the lower extent of the cylinder, the float being fabricated of a buoyant material to thereby rise and fall as the float slides up and down on the cylinder in response to an increase and decrease of the fluid level within the housing and secondary tray, a magnetic plate in a washer shaped configuration and having a flat upper surface secured to the lower surface of the float for movement therewith the base functioning to limit the downward movement of the float and magnetic plate, the wires extending along the length of the tube upwardly and out of the cylinder and cover for allowing a switching to control the level of fluid within the container, the disk being an electrical induction member adapted to create an electrical flow within the wires when the float and magnetic plate rests on the base with little or no fluid within the housing, the disk adapted to terminate an electrical flow within the wires when the float and magnetic plate rise above the stripped ends of the wires due to excess fluid within the housing, thereby activating and inactivating a switch in response to the rise and fall of fluid within the coupling.

* * * * *